May 15, 1928.
H. PERROT
AUTOMOBILE BRAKE
Filed Feb. 12, 1925
1,670,000
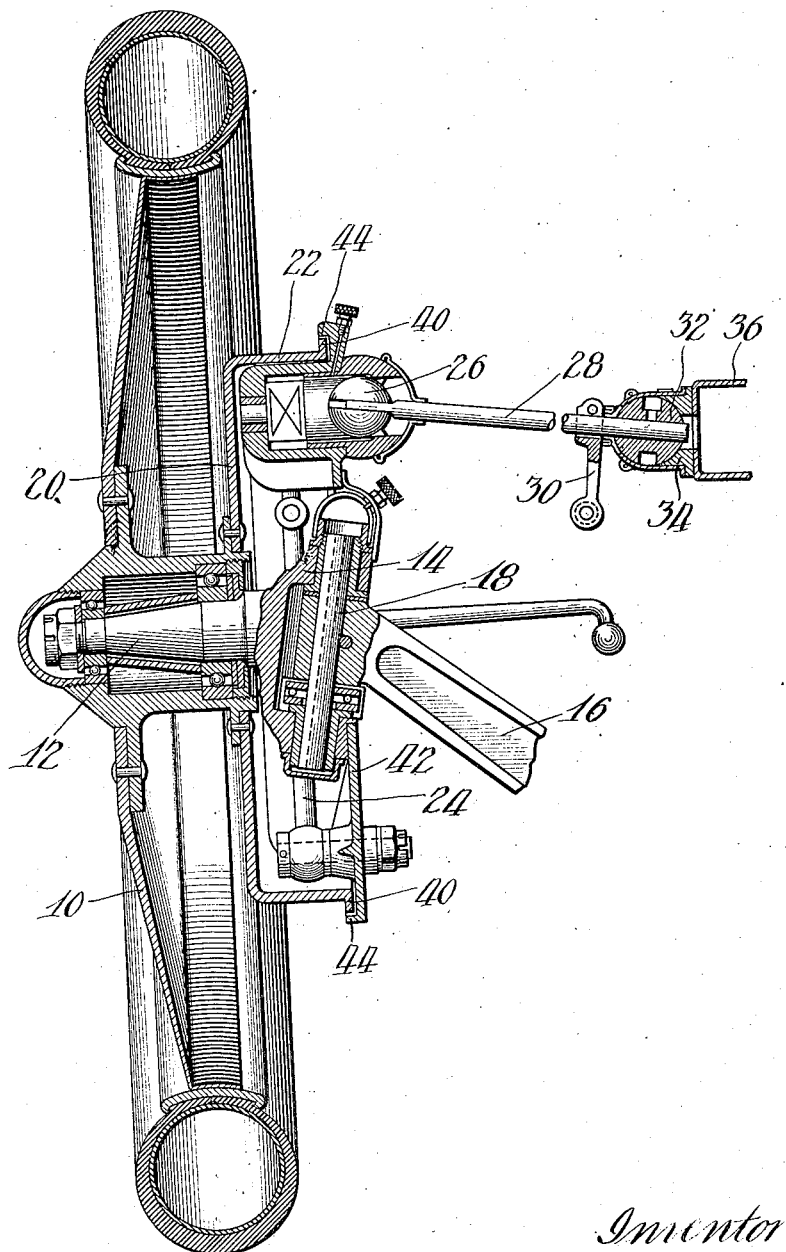

Patented May 15, 1928.

1,670,000

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

AUTOMOBILE BRAKE.

Original application filed August 25, 1922, Serial No. 584,324. Divided and this application filed February 12, 1925. Serial No. 8,631.

This invention relates to brakes, and is illustrated as embodied in an automobile chassis. An object of the invention is to provide a tight joint between the drum and backing plate of the brake, to enclose and protect the operating parts against dirt, mud etc. Heretofore it has been impracticable to secure any high degree of tightness in this joint, owing to the difficulty of finishing the drum surface with sufficient accuracy, on the inside for engagement by the shoes or the like, and on the outside to fit against a part of the backing plate. Moreover especially when descending long hills, the drum becomes heated and is likely to be distorted more or less, and this adds greatly to the difficulty of securing a joint which is always tight.

The present invention contemplates reinforcing the drum by a radial outwardly-extending flat flange at the free edge of the cylindrical braking flange, such a radial flange not only guarding effectively against distortion, but moreover being cheaply and accurately finished to a truly circular outline exactly coaxial with respect to the drum, thus making a tight joint possible by providing the backing plate with an axially-extending flange closely encircling the radial flange of the drum.

The above and other features of the invention, including various novel combinations of parts and desirable particular constructions, will be apparent from the following description of one illustrative embodiment shown in the accompanying drawing, in which:

The figure is a vertical transverse section through one front wheel and its associated brake.

In the arrangement selected for illustration, the disk wheel 10 is rotatably mounted on the spindle 12 of a knuckle 14 swiveled to the axle 16 by a king pin 18. The brake includes a drum having a part 20 secured to the wheel and a cylindrical braking flange 22 engageable by friction means such as expansible shoes or the like 24. As explained in my co-pending applications Nos. 584,324, filed Aug. 25, 1922, and 689,219, filed Jan. 29, 1924, the shoes 24 or their equivalent may be controlled by a cam operated through a universal joint 26 by a shaft 28 rocked by an arm 30 connected to the brake pedal or other operating mechanism, the shaft being slidably supported at its inner end in a ball 32 having universal movement in a socket 34 carried by the chassis side frame member 36. Except as further described below, the above-identified parts may be of any desired construction, and while the brake is illustrated on a swivelled front wheel, the invention covered by the present application is equally applicable to rear wheel and other brakes.

According to my invention, the brake drum is provided, at the free edge of the cylindrical flange 22, with a flat radial outwardly-extending flange 40, which is easily and accurately finished to have a truly circular outline exactly coaxial with respect to the axis of the wheel and drum. A tight joint is insured by providing the backing plate 42 with a relatively short axially extending flange 44 which closely encircles the radial flange 40. It will be seen that not only is a tight joint formed in an inexpensive manner, due to the small amount of accurate machining required, but that the joint extends horizontally, which guards it against most of the dirt and mud, etc., and also it faces the wheel 10, which serves as a shield to keep the dirt and mud away from the joint. For the last reason, while most of the advantages of the invention can be secured with any wheel, a disk is preferred.

While one illustrative embodiment has been described in detail, it is not my intention to limit the scope of the invention to that particular embodiment, or otherwise than by the terms of the appended claims.

I claim:

1. In combination, a disk wheel having a brake drum, a backing plate having an axially-extending flange of substantially the same thickness as the body portion of the plate encircling the free edge of the drum to provide a joint facing toward and shielded by the disk wheel, and friction means enclosed between the drum and backing plate anchored on the backing plate.

2. In combination, a disk wheel having a brake drum with a cylindrical braking flange and an outwardly-extending circular radial flange having an axial thickness no greater than the radial thickness of the radial flange, a backing plate with a cylindrical flange closely encircling the radial flange to form a joint facing toward and shielded by the disk wheel, and friction means enclosed between the drum and backing plate anchored on the backing plate.

3. A brake comprising a brake drum having a cylindrical braking flange and a marginal flange of substantially the same axial thickness as the radial thickness of the braking flange extending radially of the cylindrical flange, a backing plate secured adjacent the drum, the marginal flange and the backing plate having two angularly disposed and respectively closely juxtaposed surfaces.

In testimony whereof I have hereunto subscribed my name.

HENRI PERROT.